Patented Oct. 13, 1925.

1,557,153

UNITED STATES PATENT OFFICE.

ANTHONY GEORGE, OF NIAGARA FALLS, NEW YORK, ASSIGNOR TO THE MATHIESON ALKALI WORKS, INC., OF NEW YORK, N. Y., A CORPORATION OF VIRGINIA.

MANUFACTURE OF BENZOIC ACID FROM BENZOTRICHLORIDE.

No Drawing.   Application filed July 22, 1924. Serial No. 727,412.

*To all whom it may concern:*

Be it known that I, ANTHONY GEORGE, a citizen of Greece (who has declared his intention of becoming a citizen of the United States), residing at Niagara Falls, in the county of Niagara, State of New York, have invented certain new and useful Improvements in the Manufacture of Benzoic Acid from Benzotrichloride; and I do hereby declare the following to be a full, clear, and exact description of the invention, such as will enable others skilled in the art to which it appertains to make and use the same.

This invention relates to an improved method for the manufacture of benzoic acid from benzotrichloride, and includes improvements in the purification of the benzoic acid as well as in the method of its production.

The usual method of converting benzotrichloride to benzoic acid is to treat the chloride with an aqueous alkaline solution either in the presence or in the absence of some catalyst such as iron powder. The alkali reacts with the benzotrichloride forming a water solution of alkali chloride and benzoate. This solution must then be treated with acid in order to precipitate the benzoic acid and so render possible a separation from the chloride by filtration.

The production of benzoic acid from benzotrichloride according to the usual method thus referred to requires a large amount of labor for the operation and maintenance of the plant and is otherwise an objectionable method.

The present invention relates to an improved method for the manufacture of benzoic acid from benzotrichloride according to which the use of aqueous alkaline solutions are obviated, and according to which the hydrolysis of the benzotrichloride with water is effected in the absence of such aqueous alkaline solution.

The direct hydrolysis of benzotrichloride with water alone, to produce benzoic acid and hydrochloric acid, can be effected at high temperatures under pressure, e. g., at temperatures around 140 to 190° C.

We have found, however, that if a small amount of a catalyst, such as, for example, anhydrous zinc chloride, be suspended in the benzotrichloride, and water or steam slowly added with agitation at such a rate that it will react as fast as it is added, the formation of benzoic acid with the evolution of hydrochloric acid gas can be brought about at temperatures in the neighborhood of 100 to 110° C.

It is important, in carrying out the present process, that the rate of addition of water or steam should not be in excess of the rate at which it reacts. If excess water accumulates in the reaction vessel, it will dissolve the catalyst and thereby retard or inhibit the reaction. In order that the reaction may proceed properly, the catalyst should remain in suspension as an anhydrous solid or as solid particles with some adsorbed water; at no time should sufficient water be present to dissolve the catalyst as such aqueous solutions are not effective in promoting the reaction. It is also important that the agitation be sufficient to disperse the water and to maintain the catalyst in suspension, so that intimate contact will be brought about between the water, the catalyst and the benzotrichloride.

An advantageous method of providing the catalyst is to impregnate some light inert material such as pumice, charcoal, or asbestos, etc., with the zinc chloride. By the use of such an inert material as a carrier for the zinc chloride, the zinc chloride is readily brought to the surface of the benzotrichloride with a minimum of agitation, so that it comes in contact with the water as soon as the water enters the reactor. The accumulation of water with the consequent retardation of the reaction is thereby prevented. When zinc chloride is used without such an inert carrier, the agitation should be increased in order to bring about a sufficiently intimate contact between the zinc chloride, the added water or steam, and the benzotrichloride.

At the end of the reaction, the fused benzoic acid layer can advantageously be washed with hot water before it is drawn off. A product is thus obtainable practically free from chloride and sufficiently pure for conversion into sodium benzoate by the usual procedure of dissolving in caustic soda, with further purification, if desired, in any suitable manner.

In carrying out the process of the present invention, other catalysts than zinc chloride can be used, although I consider zinc chloride particularly advantageous. Thus, I have found that zinc oxide, hydroxide, oxychloride, benzoate and sulphate are effective when in a dry state. These compounds are rapidly converted to the chloride when the reaction starts. Similar dry compounds of copper, tin, nickel, manganese, aluminum, and iron have been found to promote the reaction. Zinc chloride, however, possesses high catalytic activity and a minimum tendency to blacken the reaction mass, and it is available in ample amounts and at a low cost.

The purity of the benzoic acid produced is somewhat dependent upon the purity of the benzotrichloride treated. Impurities in the benzotrichloride are largely condensed to form dark-colored compounds or carbon. The amount of such condensation is greater with large amounts of catalyst and at higher temperatures. When the benzotrichloride contains benzal chloride, low yields of benzaldehyde are obtained if the hydrolysis is carried out at about 100° C. It is possible, however, when large amounts of benzal chloride are present, to carry out the hydrolysis below 100° C., in which case higher yields of benzaldehyde are obtained. Ring chlorinated benzotrichloride is probably hydrolyzed to from chlorbenzoic acid which will be present in the product. In order to obtain high yields of a good quality product, the benzotrichloride itself should be of high quality. Such a high quality benzotrichloride can be produced by chlorination in light at 100 to 150° C. until the specific gravity is 1.375 to 1.385 at 20° C. When toluene is chlorinated under these conditions, practically theoretical yields of benzoic acid are obtained from the benzotrichloride, and the organic chlorine compounds in the purified product are present only in traces, e. g., less than 0.2%.

The invention will be further illustrated by the following specific description, but it is intended and will be understood that the invention is illustrated thereby, but is not limited thereto:

750 lbs. of chlorinated toluene, produced for example as described above, of specific gravity 1.38 at 20° C., are placed in a 100 gal. stoneware vessel provided with a stirrer and capable of being heated as for instance by placing it in an oil bath. A reflux condenser is not required. With the agitator in operation, the temperature of the benzotrichloride is brought to about 100° C. and pumice impregnated with zinc chloride is added in such amounts that about 5 lbs. of zinc chloride are introduced.

Water is then run in slowly, preferably through a glas tube extending underneath the surface of the liquor, and this water is distributed by the agitation. Hydrochloric acid gas is evolved immediately at a rate directly controllable by the rate at which water is added, but this rate of addition is nevertheless so regulated that it is not in excess of the rate at which it reacts. The hydrochloric acid evolved, which contains only traces of organic impurities, may be absorbed in water according to any of the well-known methods, and thus recovered as aqueous hydrochloric acid.

In order to prevent solidification as the reaction proceeds, the temperature is gradually raised until near the end of the reaction it reaches 110–115° C. It should not exceed about 120° C. as a maximum, otherwise excessive decomposition or charring will occur. When the reaction is completed, as indicated by absence of hydrochloric acid evolution, about 10 to 12 lbs. of water are added and the mixture is allowed to digest for about ½ hour with stirring. The water lowers the solidification point so that the temperature may be reduced for this digestion to about 95 to 100° C. The total water used up to this point will amount to about 125 lbs. After digestion is complete, about 15 gallons of hot water are run in and the mass stirred for about ½ hour at about 90 to 100° C. This washing serves to remove the zinc chloride and hydrochloric acid to the water layer. The lower layer is then siphoned off to a receiver in which the molten benzoic acid is allowed to solidify. The water layer is run to a cooling tank, where the dissolved benzoic acid separates out and can be subsequently filtered off and washed. The solid portion containing water, pumice, and about 90% of the yield of benzoic acid can, if desired, be converted to sodium benzoate of high quality simply by dissolving in sodium hydroxide, filtering off the pumice, and purifying the benzoate solution, if desired, in any suitable manner.

The crude benzoic acid present in the reactor at the end of the reaction may contain around 1 to 3% of inorganic chlorine present as hydrochloric acid and zinc chloride. This inorganic chlorine can, however, be reduced to as low as 0.2 to 0.3% or lower by adding water to the product before removing the product from the reactor, and by agitating the product with the water, in the manner above described. The lower layer consisting of benzoic acid and some water can then be drawn off and treated to convert the benzoic acid into sodium benzoate, as above described. Some benzoic acid is dissolved in the water and is separated with the water layer. This can be recovered in pure form by simply cooling the solution, filtering, and washing with cold water.

Other methods of purification of the benzoic acid produced can be used. For example, the reaction mass may be withdrawn from the reactor at the end of the reaction, and purified by crystallization from water, sublimation, or other suitable method of purification of benzoic acid. The method of purification above described, however, is a particularly advantageous method and is included as a part of the invention.

The process of the above specific description is believed to be the best method of carrying out the invention, but the specific procedure described can be varied and the invention is not limited to these particular conditions. For example, the kind of catalyst used and the method of adding it to the reactor can be varied, as well as the method of adding the water, whether as vapor or liquid, and the type of apparatus used. The temperatures, length of time of digestion, and method of purification, may also be varied without departing from the spirit or digressing beyond the limits of the invention, except in so far as the specific purification process of the invention is claimed in certain of the claims.

It will thus be seen that the invention provides an improved method for the production of benzoic acid from benzotrichloride without the use of aqueous alkaline solution and with the direct combination of water with the benzotrichloride in the presence of a catalyst such as zinc chloride, the water being added in regulated amounts at such a rate that it will react as fast as it is added, thus avoiding excess of water or accumulation of excess water during the reaction.

I claim:

1. The method of producing benzoic acid from benzotrichloride which comprises hydrolyzing the benzotrichloride directly with water in the presence of an anhydrous metal compound at a temperature of about 100 to 120° C., the reaction mixture being agitated, and the water being added at substantially the rate at which it reacts.

2. The method of producing benzoic acid from benzotrichloride which comprises hydrolyzing the benzotrichloride directly with water in the presence of anhydrous zinc chloride at a temperature of about 100 to 120° C., the reaction mixture being agitated, and the water being added at substantially the rate at which it reacts.

3. The method of producing benzoic acid from benzotrichloride which comprises suspending an anhydrous catalyst in the benzotrichloride, heating the benzotrichloride to a temperature of about 100° C., and introducing water slowly with agitation, the water being introduced at a rate approximately equal to that at which it reacts.

4. The method of producing benzoic acid from benzotrichloride which comprises suspending an anhydrous catalyst in the benzotrichloride, heating the benzotrichloride to a temperature of about 100° C., and introducing water slowly with agitation, the water being introduced at a rate approximately equal to that at which it reacts, and the reaction being carried out at a gradually increased temperature to prevent solidification as the reaction proceeds.

5. The method of producing benzoic acid from benzotrichloride which comprises adding water gradually to the benzotrichloride at a temperature of about 100 to 120° C., the benzotrichloride being agitated and containing in suspension therein a catalyst carried by an inert carrier, the catalyst consisting of an anhydrous metal compound.

6. The method of producing benzoic acid from benzotrichloride which comprises adding water gradually to the benzotrichloride at a temperature of about 100 to 120° C., the benzotrichloride being agitated and containing in suspension therein a catalyst supported on an inert carrier, the catalyst containing as an active agent only anhydrous zinc chloride.

7. The method of producing benzoic acid from benzotrichloride, which comprises hydrolyzing the benzotrichloride directly with water in the presence of a catalyst in a reaction vessel at a temperature of about 100° to 120° C. until hydrochloric acid gas is no longer evolved, the water being added at substantially the rate at which it reacts, thereafter adding water to the reaction product in the same reaction vessel and maintaining the mixture at an elevated temperature, and subsequently separating the aqueous solution from the product.

8. The method of producing benzoic acid from benzotrichloride, which comprises hydrolyzing the benzotrichloride directly with water in the presence of a catalyst at a temperature of about 100 to 120° C., the reaction mixture being agitated and the water being added at substantially the rate at which it reacts, and the reaction mixture being heated for a further period of time after the addition of the water has been completed.

9. The method of producing benzoic acid from benzotrichloride which comprises hydrolyzing the benzotrichloride directly with water in the presence of anhydrous zinc chloride at a temperature of about 100 to 120° C., the reaction mixture being agitated, and the water being added at substantially the rate at which it reacts, and the heating of the reaction mixture being continued for a further period of time after the addition of the water has been completed.

10. The method of producing benzoic acid from benzotrichloride which comprises adding water gradually to the benzotrichloride at a temperature of about 100 to 120° C., the benzotrichloride being agitated and containing in suspension therein anhydrous zinc chloride supported on an inert carrier, and the reaction mixture being heated for a further period of time after the addition of the water has been completed.

11. The method of producing benzoic acid from benzotrichloride, which comprises hydrolyzing the benzotrichloride directly with water in the presence of a catalyst containing as an active agent only anhydrous zinc chloride at a temperature of about 100° to 120° C., the reaction mixture being agitated, and the water being added at substantially the rate at which it reacts.

12. The method of producing benzoic acid from benzotrichloride, which comprises hydrolyzing the benzotrichloride directly with water in the presence of a catalyst containing as an active agent only an anhydrous metal compound at a temperature of about 100° to 120° C., the reaction mixture being agitated, and the water being added at substantially the rate at which it reacts.

In testimony whereof I affix my signature.

ANTHONY GEORGE.